US012775133B2

(12) United States Patent
Takeda

(10) Patent No.: US 12,775,133 B2
(45) **Date of Patent: *Oct. 27, 2026**

(54) WIRE GRID POLARIZATION PLATE HAVING PROTECTIVE FILM FORMED FROM ALUMINUM OXIDE

(71) Applicant: DEXERIALS CORPORATION, Tochigi (JP)

(72) Inventor: Tomu Takeda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 548 days.

This patent is subject to a terminal disclaimer.

(21) Appl. No.: 17/997,783

(22) PCT Filed: May 12, 2021

(86) PCT No.: PCT/JP2021/017996
§ 371 (c)(1),
(2) Date: Nov. 2, 2022

(87) PCT Pub. No.: WO2021/230275
PCT Pub. Date: Nov. 18, 2021

(65) Prior Publication Data

US 2023/0168422 A1 Jun. 1, 2023

(30) Foreign Application Priority Data

May 12, 2020 (JP) ................................. 2020-083839

(51) Int. Cl.
*G02B 1/115* (2015.01)
*G02B 1/14* (2015.01)
(Continued)

(52) U.S. Cl.
CPC ............ *G02B 5/3058* (2013.01); *G02B 1/115* (2013.01); *G02B 1/14* (2015.01); *G02F 1/133548* (2021.01)

(58) Field of Classification Search
CPC ............ G02B 1/11–118; G02B 5/3058; G02F 1/133548
See application file for complete search history.

(56) References Cited

U.S. PATENT DOCUMENTS 10,775,538 B2 9/2020 Oowada
2002/0191880 A1 12/2002 Borrelli et al.
(Continued)

FOREIGN PATENT DOCUMENTS

CN 109975910 7/2019
JP 5359128 9/2008
(Continued)

OTHER PUBLICATIONS

"International Application Serial No. PCT/JP2021/017996, International Search Report dated Jul. 13, 2021", w/ English Translation, (Jul. 13, 2021), 5 pgs.
(Continued)

*Primary Examiner* — Ryan S Dunning
(74) *Attorney, Agent, or Firm* — Schwegman Lundberg & Woessner, P.A.

(57) ABSTRACT

This polarization plate is a polarization plate with a wire grid structure, having a transparent substrate, a plurality of projections which are formed on a first surface of the transparent substrate, extend in a first direction, and are arrayed at a pitch that is shorter than the wavelength of the used light region, and an antireflection layer which is formed on a second surface of the transparent substrate on the opposite side from the first surface, wherein surfaces of the plurality of projections and a surface of the antireflection layer are covered with protective films respectively formed from a second dielectric material.

12 Claims, 7 Drawing Sheets

(51) Int. Cl.
*G02B 5/30* (2006.01)
*G02F 1/1335* (2006.01)

(56) References Cited

U.S. PATENT DOCUMENTS

| | | | | |
|---|---|---|---|---|
| 2004/0218270 | A1 | 11/2004 | Wang | |
| 2008/0186576 | A1 | 8/2008 | Takada | |
| 2011/0080643 | A1* | 4/2011 | Niinou | G02B 1/118 359/599 |
| 2017/0123240 | A1* | 5/2017 | Gafsi | G02B 5/3025 |
| 2018/0067246 | A1 | 3/2018 | Oowada | |
| 2019/0041564 | A1* | 2/2019 | Nielson | C23C 14/345 |
| 2019/0196080 | A1 | 6/2019 | Kumai | |
| 2019/0204490 | A1* | 7/2019 | Takeda | G02B 7/008 |
| 2020/0119073 | A1* | 4/2020 | Machida | G02B 5/3058 |
| 2024/0069378 | A1* | 2/2024 | Takeda | G02F 1/133548 |

FOREIGN PATENT DOCUMENTS

| | | | |
|---|---|---|---|
| JP | 2008216957 | A | 9/2008 |
| JP | 2010145608 | | 7/2010 |
| JP | 2010210705 | | 9/2010 |
| JP | 5184624 | | 1/2013 |
| JP | 2014164124 | | 9/2014 |
| JP | 2015108845 | | 6/2015 |
| JP | 2016536651 | A | 11/2016 |
| JP | 2018040888 | A | 3/2018 |
| JP | 2019047392 | A | 3/2019 |
| JP | 2019061226 | A | 4/2019 |
| JP | 2019536074 | A | 12/2019 |
| JP | 2020140073 | | 9/2020 |
| WO | 2012118204 | | 9/2012 |
| WO | WO-2015060939 | A1 | 4/2015 |
| WO | WO-2017131581 | A1 | 8/2017 |
| WO | 2017155017 | | 9/2017 |
| WO | WO-2018097873 | A1 | 5/2018 |

OTHER PUBLICATIONS

"Japanese Application No. 2020-083839, Notice of Allowance dated Sep. 10, 2024", w English Translation, (Sep. 10, 2024), 5 pgs.
"Chinese Application No. 202180032900.2, Office Action dated Sep. 6, 2025", w English Translation, (Sep. 6, 2025), 22 pgs.

* cited by examiner

| | | λ=430-510nm | λ=520-590nm | λ=600-680nm |
|---|---|---|---|---|
| —◆— | NO PROTECTIVE FILMS | 89.1 | 89.8 | 90.2 |
| —■— | PROTECTIVE FILMS 1nm | 88.2 | 89.2 | 89.9 |
| —▲— | PROTECTIVE FILMS 2.5nm | 87.5 | 88.7 | 89.6 |
| —×— | PROTECTIVE FILMS 5nm | 86.1 | 87.7 | 88.8 |
| —●— | PROTECTIVE FILMS 7.5nm | 84.5 | 86.2 | 87.9 |
| —✳— | PROTECTIVE FILMS 10nm | 83.4 | 85.1 | 86.9 |

| | | λ=430~510nm | λ=520~590nm | λ=600~680nm |
|---|---|---|---|---|
| —◆— | NO PROTECTIVE FILMS | 91.2 | 92.2 | 91.8 |
| —■— | PROTECTIVE FILMS 2.5nm | 90.4 | 91.9 | 91.7 |
| —▲— | PROTECTIVE FILMS 5nm | 88.5 | 90.4 | 90.7 |
| —×— | PROTECTIVE FILMS 7.5nm | 85.1 | 87.3 | 88.6 |

WIRE GRID POLARIZATION PLATE HAVING PROTECTIVE FILM FORMED FROM ALUMINUM OXIDE

PRIORITY APPLICATIONS

This application is a U.S. National Stage Filing under 35 U.S.C. § 371 from International Application No. PCT/JP2021/017996, filed on May 12, 2021, and published as WO2021/230275 on Nov. 18, 2021, which claims the benefit of priority to Japanese Application No. 2020-083839, filed on May 12, 2020; the benefit of priority of each of which is hereby claimed herein, and which applications and publication are hereby incorporated herein by reference in their entireties.

TECHNICAL FIELD

The present invention relates to a polarization plate, a production method for the polarization plate, and an optical apparatus.

BACKGROUND ART

Polarization plates are optical elements which absorb polarized light of a first direction and transmit polarized light of a direction orthogonal to the first direction. In liquid crystal display devices, polarization plates are a fundamental requirement. Particularly in the case of liquid crystal display devices that use a power source with a large luminous energy, such as transmissive liquid crystal projectors, the polarization plate is exposed to powerful radiation, and therefore not only requires excellent heat resistance and light resistance, but should also have a size of about several cm, a high extinction ratio, and be capable of controlling the reflectance characteristics. In order to satisfy these demands, wire grid inorganic polarization plates have been proposed.

Wire grid polarization plates have a structure in which a plurality of conducting wires that extend along a single direction are arrayed on a substrate at a pitch (within a range from several tens of nm to several hundreds of nm) that is narrower than the wavelength region of the light being used. When light is incident on this type of polarization plate, polarized light parallel with the direction of extension of the wires (TE waves (S waves)) cannot be transmitted, whereas polarized light perpendicular to the direction of extension of the wires (TM waves (P waves)) is transmitted.

Wire grid polarization plates have excellent heat resistance and light resistance, enable the production of comparatively large elements, and have a high extinction ratio. Further, by employing a multilayer structure, control of the reflectance characteristics also becomes possible, and image degradation such as ghosting, which occurs when return light reflected off the surface of the polarization plate is reflected again inside the liquid crystal projector apparatus, can be reduced, making these structures suitable for applications such as liquid crystal projectors.

Due to the circumstances outlined above, a variety of polarization plates have been proposed as wire grid polarization plates.

PRIOR ART LITERATURE

Patent Documents

Patent Document 1: Japanese Translation of PCT International Application, Publication No. 2016-536651

Patent Document 2: Japanese Translation of PCT International Application, Publication No. 2019-536074

SUMMARY OF INVENTION

Problems to be Solved by the Invention

Patent Document 1 discloses a polarization plate in which side bars are formed on the side walls of a wire grid polarizer (polarization plate), enabling mutual support, and a polarization plate in which the gaps within the wire grid polarizer are filled. It is disclosed that this enables the durability of the wire grid polarizer to be improved, and results in favorable polarization characteristics in the visible spectrum. However, improving the durability of a high aspect ratio wire grid polarizer using only side bars requires a natural thickening of the width of the side bars, making favorable polarization characteristics such as reduced transmittance and increased reflectance unattainable. Further, in a similar manner, when the gaps within a wire grid polarizer are filled, although the durability of the wire grid polarizer improve, favorable polarization characteristics such as reduced transmittance and increased reflectance are unattainable.

Patent Document 2 discloses a polarization plate in which an overcoat layer is formed from the tip ends of a wire grid polarizer (polarization plate) across the side walls, and a polarization plate in which an antireflection layer is formed on top of the overcoat layer. It is disclosed that this enables the wire grid polarizer to have improved durability and higher performance. However, even if the overcoat layer is assumed to support the wire grid polarizer and prevent collapse, because the structure includes an air layer, high-performance polarization characteristics such as reduced transmittance and increased reflectance are unattainable. Further, it is thought that the formation of an antireflection layer on top enables restoration of the polarization characteristics, but an improvement in the durability of the antireflection layer itself cannot be achieved.

In recent years, the light sources for illumination and displays have been evolving from lamps to LEDs and lasers, and even in liquid crystal projectors, higher luminous flux and higher levels of brightness are being achieved by using a number of semiconductor lasers (LD). Accordingly, the polarization plate requires to withstand environments of high luminous intensity and to have superior transmittance characteristics. As a result, polarization plates having an optimized grid structure including the protective film are required.

The present invention has been developed in light of the above circumstances, and has the objects of providing a polarization plate which, by optimizing the grid structure including the protective film, exhibits improved transmittance characteristics in the transmission axis direction while maintaining favorable durability, as well as providing a production method for the polarization plate, and an optical apparatus containing the polarization plate.

Means for Solving the Problems

In order to achieve the above objects, the present invention provides the following aspects.

(1) A polarization plate according to one aspect of the present invention is a polarization plate with a wire grid structure, the polarization plate has a transparent substrate, a plurality of projections which are formed on a first surface of the transparent substrate, extend in a first direction, and are arrayed periodically and separated from each other at a pitch that is shorter than the wavelength of the used light region, and an antireflection layer which is formed on a second surface of the transparent substrate on the opposite side from the first surface, wherein the plurality of projections each have, in order from the side of the transparent substrate, a reflection layer, a dielectric layer formed from a first dielectric material, and an absorption layer, and the surfaces of the projections and the surface of the antireflection layer are covered with a protective film composed of a dielectric layer formed from a second dielectric material.

(2) In the polarization plate of the aspect described above, the thickness of the protective film may be 2.5 nm or less.

(3) In the polarization plate of the aspect described above, the thickness of the protective film may be 2.5 nm or greater.

(4) In the polarization plate of the aspect described above, the dielectric layer formed from the first dielectric material may be formed from $SiO_2$, and the protective film formed from the second dielectric material may be formed from $Al_2O_3$.

(5) In the polarization plate of the aspect described above, the protective film formed from the second dielectric material may be an ALD film.

(6) In the polarization plate of the aspect described above, the antireflection layer may be an alternating laminate of a high-refractive index film and a low-refractive index film.

(7) In the polarization plate of the aspect described above, the antireflection layer may be an ion beam assisted vapor deposition film or an ion beam sputtering film.

(8) In the polarization plate of the aspect described above, the high-refractive index film may be formed from $TiO_2$, and the low-refractive index film may be formed from $SiO_2$.

(9) In the polarization plate of the aspect described above, the transparent substrate is transparent to the wavelength of the used light region, and may be composed of a material selected from the group consisting of glass, rock crystal, quartz and sapphire.

(10) In the polarization plate of the aspect described above, the dielectric layer formed from the first dielectric material may be composed of a material selected from the group consisting of Si oxides, Ti oxides, Zr oxides, Al oxides, Nb oxides and Ta oxides.

(11) In the polarization plate of the aspect described above, the reflection layer may be composed of aluminum or an aluminum alloy.

(12) In the polarization plate of the aspect described above, the absorption layer may be composed of a material that has an absorption action relative to the wavelength of the used light region, and that may be selected from the group consisting of metals, alloy materials and semiconductor materials.

(13) In the polarization plate of the aspect described above, the surface of the polarization plate may be covered with an organic water-repellent film.

(14) A production method for a polarization plate according to the another aspect of the present invention is a production method for a polarization plate having a wire grid structure, and the method has a step of forming a reflection layer, a dielectric layer formed from a first dielectric material, and an absorption layer in order on a first surface of a transparent substrate, thus producing a laminate composed of the reflection layer, the dielectric layer and the absorption layer, a step of selectively etching the laminate to form a plurality of projections which extend in a first direction and are arrayed periodically and separated from each other at a pitch that is shorter than the wavelength of the used light region, a step of forming an antireflection layer on a second surface of the transparent substrate on the opposite side from the first surface, and a step of forming a protective film formed from a second dielectric material on a surfaces of the projections and a surface of the antireflection layer.

(15) In the production method for a polarization plate of the other aspect described above, the thickness of the protective film may be 2.5 nm or less.

(16) In the production method for a polarization plate of the other aspect described above, the thickness of the protective film may be 2.5 nm or greater.

(17) In the production method for a polarization plate of the other aspect described above, the method may also have a step of forming an organic water-repellent film on a surface of the polarization plate.

(18) An optical apparatus according to yet another aspect of the present invention includes the polarization plate of the aspect described above.

Effects of the Invention

By using the present invention, a polarization plate can be provided which exhibits improved transmittance characteristics in the transmission axis direction while maintaining favorable durability.

EMBODIMENTS FOR CARRYING OUT THE INVENTION

Embodiments of the present invention are described below in detail with appropriate reference to the drawings.

The drawings used in the following description may sometimes be drawn with specific portions enlarged as appropriate to facilitate comprehension of the features of the present invention, and the dimensional ratios and the like between the constituent elements may differ from the actual values. Further, the materials and dimensions and the like presented in the following description are merely examples, which in no way limit the present invention, and may be altered as appropriate within the scope of the present invention.

[Polarization Plate]

Figure 1:
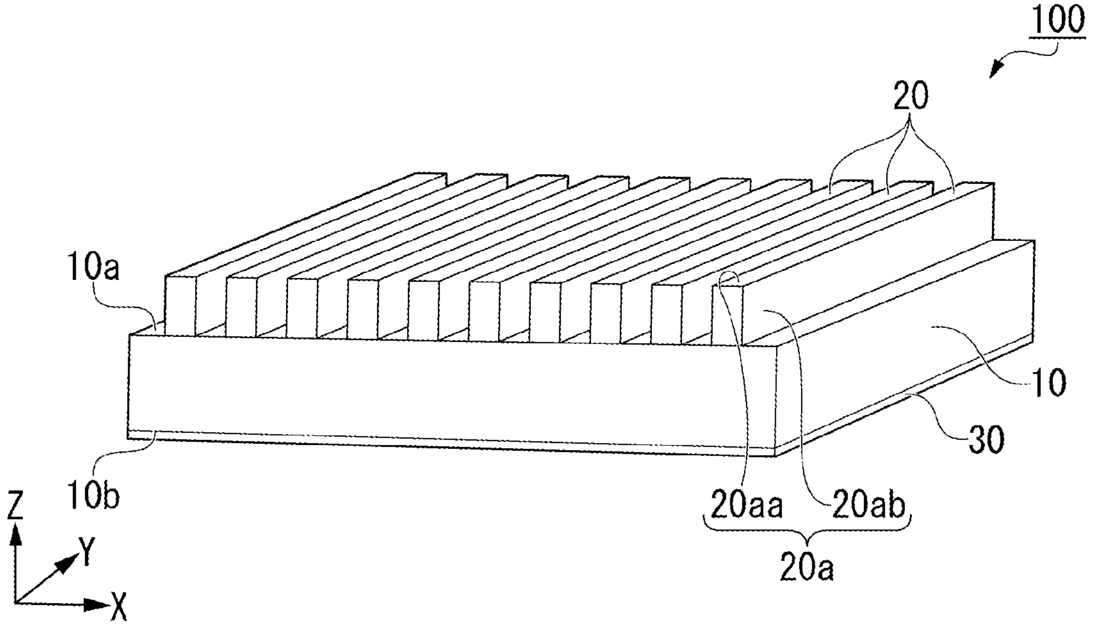
FIG. 1 is a perspective schematic view of a polarization plate according to an embodiment of the present invention.

FIG. 1 is a perspective schematic view of a polarization plate according to one embodiment of the present invention.

Figure 2:
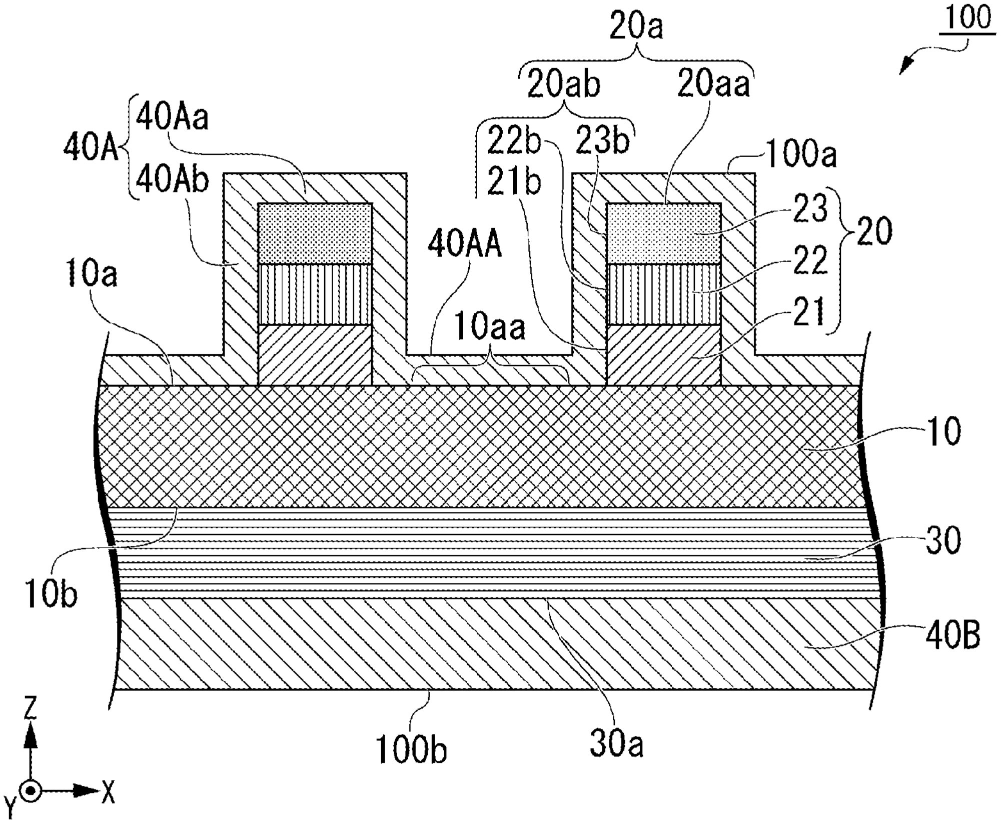
FIG. 2 is a cross-sectional schematic view of a polarization plate according to an embodiment of the present invention.

The polarization plate 100 illustrated in FIG. 1 has a wire grid structure, and includes a transparent substrate 10, a plurality of projections 20 which are formed on a first surface 10*a* of the transparent substrate 10, are arrayed at a pitch that is shorter than the wavelength of the used light region, and extend in a first direction (the Y direction), and an antireflection layer 30 which is formed on a second surface 10*b* of the transparent substrate 10 on the opposite side from the first surface 10*a*, wherein the surfaces of the plurality of projections 20 and the surface of the antireflection layer 30 are each covered with a protective film formed from a dielectric material (which is not shown in FIG. 1, but is shown in FIG. 2).

As illustrated in FIG. 1, the direction along which the plurality of projections 20 extend (the first direction) is deemed the Y axis direction. The direction orthogonal to the Y axis direction that extends along the main surface of the transparent substrate 10 across which the plurality of projections 20 are arrayed is deemed the X axis direction, and the direction orthogonal to both the X axis direction and the Y axis direction and perpendicular to the main surface of the transparent substrate 10 is deemed the Z axis direction. The light incident on the polarization plate 100 may be irradiated from either the first surface side or the second surface side of the transparent substrate 10, but as exemplified in FIG. 1, is preferably incident from the first surface side (the grid surface side) where the plurality of projections 20 have been formed on the transparent substrate 10, from the Z axis direction that is orthogonal to the X axis direction and the Y axis direction.

A polarization plate having a wire grid structure utilizes the four selective absorption actions for polarized light provided by transmittance, reflection, interference and optical anisotropy to attenuate polarized light waves having an electric field component parallel to the Y axis direction (TE waves (S waves)) while transmitting polarized light waves having an electric field component parallel to the X axis direction (TM waves (P waves)). Accordingly, in FIG. 1, the Y axis direction is the direction of the absorption axis for the polarization plate 100, and the X axis direction is the direction of the transmission axis for the polarization plate 100.

FIG. 2 is a cross-sectional schematic view of the polarization plate 100 according to one embodiment of the present invention.

The polarization plate 100 illustrated in FIG. 2 includes the transparent substrate 10, the plurality of projections 20 which are formed on the first surface 10*a* of the transparent substrate 10, extend in the first direction, and are arrayed periodically and separated from each other at a pitch that is shorter than the wavelength of the used light region, and the antireflection layer 30 which is formed on the second surface 10*b* of the transparent substrate 10 on the opposite side from the first surface 10*a*, wherein the plurality of projections 20 each have, in order from the side of the transparent substrate 10, a reflection layer 21, a dielectric layer 22 formed from a first dielectric material, and an absorption layer 23, and the surfaces 20*a* of the plurality of projections 20 and the surface 30*a* of the antireflection layer 30 are covered with protective films 40A and 40B formed from a second dielectric material.

The polarization plate 100 of this embodiment may also include other layers besides the transparent substrate 10, the reflection layer 21, the dielectric layer 22, the absorption layer 23, the protective films 40A and 40B, and the antireflection layer 30, provided the effects of the embodiment are retained.

Light incident on the polarization plate 100 illustrated in FIG. 2 from the side on which the plurality of projections 20 are formed (the grid surface side), is partially absorbed and attenuated upon passage through the absorption layer 23 and the dielectric layer 22. Of the light transmitted through the absorption layer 23 and the dielectric layer 22, polarized waves (TM waves (P waves)) are transmitted through the reflection layer 21 with a high transmittance. In contrast, of the light transmitted through the absorption layer 23 and the dielectric layer 22, polarized waves (TE waves (S waves)) are reflected by the reflection layer 21. The TE waves reflected by the reflection layer 21 are partially absorbed upon passage through the absorption layer 23 and the dielectric layer 22, and a portion are reflected and returned to the reflection layer 21. Further, the TE waves reflected by the reflection layer 21 undergo interference and are attenuated upon passage through the absorption layer 23 and the dielectric layer 22. By conducting selective attenuation of the TE waves in this manner, the polarization plate 100 is able to achieve the desired polarization characteristics.

Figure 3:
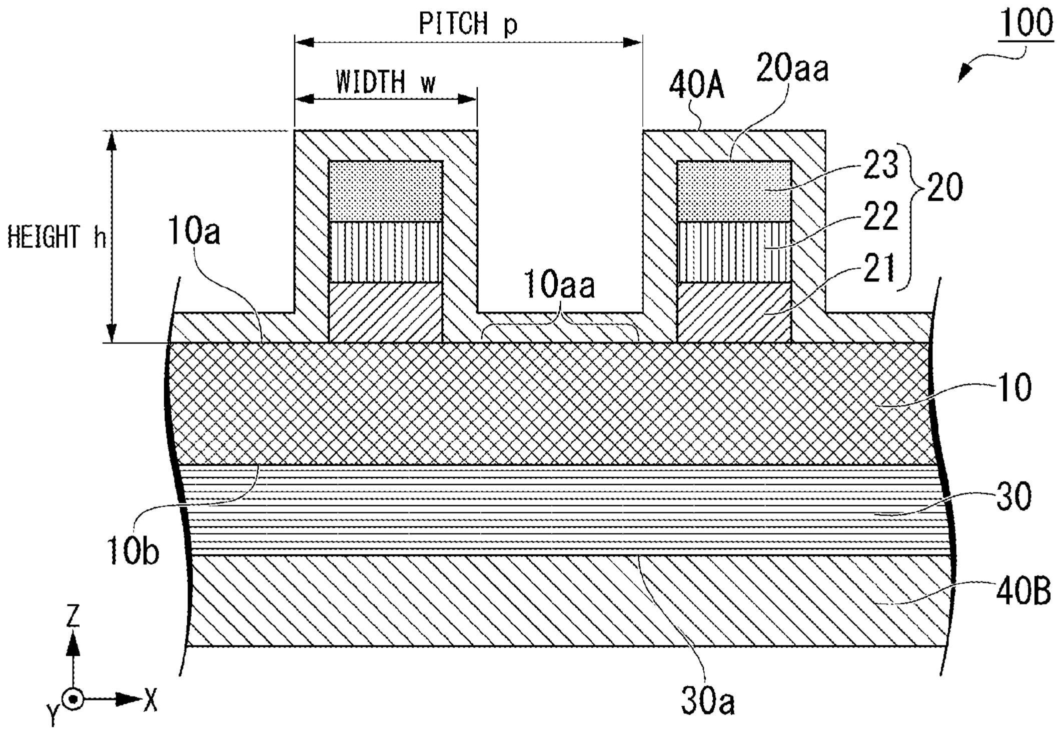
FIG. 3 is a cross-sectional schematic view describing the dimensions of a polarization plate.

The dimensions of the polarization plate 100 described in this description are described below using FIG. 3. The height h of the grid is a dimension in the Z axis direction perpendicular to the main surface of the transparent substrate 10 in FIG. 3, and means the height of the plurality of projections 20 including the protective film 40A (height (thickness) h1). The width w means the dimension in the X axis direction orthogonal to the height h direction of the plurality of projections 20 including the protective film 40A, when viewed from the Y axis direction along which the plurality of projections 20 extend. Further, the repeated spacing in the X axis direction between the plurality of projections 20 when the polarization plate 100 is viewed from the Y axis direction along which the plurality of projections 20 extend is termed the pitch p.

In the polarization plate 100 of this embodiment, there are no particular limitations on the pitch p for the plurality of projections 20, provided the pitch p is shorter than the wavelength of the used light region. From the viewpoints of ease of production and stability, the pitch p of the plurality of projections 20 is, for example, preferably within a range from 100 nm to 200 nm. This pitch p of the plurality of projections 20 can be measured by observation using a scanning electron microscope or a transmission electron microscope. For example, the pitch p may be measured at four random locations using a scanning electron microscope or a transmission electron microscope, and the arithmetic mean of those measurements then deemed the pitch p of the plurality of projections 20. In the following description, this measurement method is termed the electron microscope method.

A characteristic feature of the polarization plate 100 of this embodiment is the optimization of the thickness of the protective film 40A that covers from the tips of the grid to the grid spaces and the thickness of the protective film 40B on the antireflection layer 30. This enables the transmittance characteristics in the transmission axis direction to be improved, while maintaining favorable durability.

[Transparent Substrate]

There are no particular limitations on the transparent substrate 10, provided it is a substrate that exhibits transparency relative to the used light region, and the substrate may be selected appropriately in accordance with the intended purpose. The expression "exhibits transparency relative to the used light region" does not necessarily mean 100% transmittance of the used light region, and any level of transmittance that enables retention of the functionality as a polarization plate is sufficient. An example of the used light region is visible light having wavelengths within a range from about 380 nm to 810 nm. There are no particular limitations on the main surface shape of the transparent substrate 10, and a shape fit for purpose (for example, a rectangular shape) may be selected as appropriate. The average thickness of the transparent substrate 10 is, for example, preferably within a range from 0.3 mm to 1 mm.

The constituent material of the transparent substrate 10 is preferably a material with a refractive index of 1.1 to 2.2, and examples include glass, rock crystal, quartz and sapphire. From the viewpoints of cost and transmittance, the use of glass, and particularly quartz glass (refractive index: 1.46) or soda-lime glass (refractive index: 1.51) is preferred. There are no particular limitations on the component composition of the glass material, and inexpensive glass materials such as silicate glass that are in wide circulation as optical glass may be used.

Further, from the viewpoint of thermal conductivity, the use of rock crystal or sapphire, both of which have high thermal conductivity, is preferred. This results in superior light resistance to intense light, and enables favorable use as the polarization plate for the optical engine of a projector that generates a large amount of heat.

In those cases where a transparent substrate 10 formed from an optically active crystal such as rock crystal or sapphire is used, the plurality of projections 20 are preferably arrayed in either a parallel direction or a perpendicular direction relative to the optical axis of the crystal. This results in excellent optical characteristics. Here, the optical axis refers to the directional axis for which the difference in the refractive indices of O (ordinary rays) and E (extraordinary rays) of light travelling in that direction reaches a minimum.

[Reflection Layer]

The reflection layer 21 is formed on the transparent substrate 10, and is composed of a metal film arrayed in bands that extend along the Y axis direction that represents the absorption axis.

The reflection layer 21 functions as a wire grid polarizer, attenuating polarized light having an electric field component in a direction parallel with the lengthwise direction of the reflection layer 21 (TE waves (S waves)), and transmitting polarized light having an electric field component in a direction orthogonal to the lengthwise direction of the reflection layer 21 (TM waves (P waves)). There are no particular limitations on the thickness of the reflection layer 21, and for example, a thickness of 100 nm to 300 nm is preferred. The thickness of the reflection layer 21 can be measured, for example, by the microscope method described above.

There are no particular limitations on the constituent material for the reflective layer 21, provided it exhibits reflective properties relative to the used light region, and examples include one element selected from the group consisting of Al, Ag, Cu, Mo, Cr, Ti, Ni, W, Fe, Si, Ge and Te, and alloys containing one or more of these elements. Among these possibilities, from the viewpoint of suppressing any absorption loss in the wire grid in the visible light region and the viewpoint of cost, the reflection layer 21 is preferably composed of aluminum or an aluminum alloy. Besides these metal materials, non-metal inorganic films or resin films for which the surface reflectance has been increased by coloration or the like may also be used in forming the reflection layer 21.

The reflection layer 21 can be formed as a high-density film by using, for example, a vapor deposition method or a sputtering method. Further, the reflection layer 21 may also be formed from two or more layers of different constituent materials.

[Dielectric Layer]

The dielectric layer 22 is formed on the reflection layer 21, and is composed of a dielectric film arrayed in bands that extend along the Y axis direction that represents the absorption axis. The dielectric layer 22 is formed with a thickness within a range that ensures that the phase of the polarized light that has been transmitted through the absorption layer 23 and reflected off the reflection layer 21 is shifted by half a wavelength relative to the polarized light that has been reflected by the absorption layer 23. Specifically, the thickness of the dielectric layer 22 is set appropriately within a range from 1 nm to 500 nm to a value that enables adjustment of the phases of the polarized light to enhance the interference effect. The thickness of the dielectric layer 22 can be measured, for example, using the microscope method described above. The dielectric layer 22 is also formed as a barrier layer to suppress mutual diffusion of the constituent elements between the reflection layer 21 and the absorption layer 23 described below.

Examples of the first dielectric material that constitutes the dielectric layer 22 include typical materials such as one material selected from among metal oxides including Si oxides such as $SiO_2$, $Al_2O_3$, beryllium oxide and bismuth oxide, $MgF_2$, cryolite, germanium, titanium dioxide, silicon, magnesium fluoride, boron nitride, boron oxide, tantalum oxide and carbon, or a combination of these materials.

Among the various possibilities, from the viewpoints of the transmittance and the functionality as a barrier layer, the dielectric layer 22 is preferably composed of one or more oxides selected from the group consisting of Si oxides, Ti oxides, Zr oxides, Al oxides, Nb oxides and Ta oxides.

The refractive index of the dielectric layer 22 is preferably at least 1.0 but not more than 2.5. The optical characteristics of the reflection layer 21 are also affected by the refractive index of the surrounding material, and therefore by selecting an appropriate material for the dielectric layer 22, the optical characteristics of the polarization plate 100 can be controlled. Further, by appropriately adjusting the thickness and the refractive index of the dielectric layer 22, the TE waves reflected off the reflection layer 21 can be partially reflected upon transmission through the absorption layer 23 and returned to the reflection layer 21, and the light transmitted through the absorption layer 23 can be attenuated by interference. In this manner, by conducting selective attenuation of the TE waves, the desired polarization characteristics can be obtained.

The dielectric layer 22 can be formed as a high-density film by using a vapor deposition method, a sputtering method, a chemical vapor deposition (CVD) method, or an atomic layer deposition (ALD) method. Further, the dielectric layer 22 may also be formed from two or more layers of different constituent materials.

[Absorption Layer]

The absorption layer 23 has an absorption action relative to wavelengths of the used light region, is formed on the dielectric layer 22, and is arrayed in bands that extend along the Y axis direction that represents the absorption axis. There are no particular limitations on the thickness of the absorption layer 23, but the thickness is, for example, preferably within a range from 5 nm to 50 nm. The thickness of the absorption layer 23 can be measured, for example, using the microscope method described above.

The absorption layer 23 is preferably composed of one or more materials selected from the group consisting of metals, alloy materials and semiconductor materials.

The constituent material for the absorption layer 23 is selected appropriately in accordance with the wavelength range of the light being used.

Examples of the metal materials include one element selected from among Ta, Al, Ag, Cu, Au, Mo, Cr, Ti, W, Ni, Fe, and Sn and the like, and alloys containing one or more of these elements. Examples of the semiconductor materials include one or more materials selected from among Si, Ge, Te, ZnO and silicide materials (such as $\beta$-$FeSi_2$, $MgSi_2$, $NiSi_2$, $BaSi_2$, $CrSi_2$, $CoSi_2$ and TaSi). By using these materials, the polarization plate 100 is able to exhibit a high extinction ratio relative to the visible light region being used. Among the various possibilities, the absorption layer 23 preferably contains Fe or Ta, together with Si.

In those cases where a semiconductor material is used as the absorption layer 23, the band gap energy of the semiconductor material contributes to the light absorption action, and therefore the band gap energy must be no higher than the used light region.

For example, in the case where visible light is used, it is necessary to use a material that exhibits absorption at wavelengths of 400 nm or greater, namely a material having a band gap energy of not more than 3.1 eV.

The absorption layer 23 can be formed as a high-density film by using, for example, a vapor deposition method or a sputtering method. Further, the absorption layer 23 may also be formed from two or more layers of different constituent materials.

[Antireflection Layer]

The antireflection layer 30 is formed on the second surface 10*b* of the transparent substrate 10. The antireflection layer 30 may be formed from conventional antireflection materials, and for example, may be composed of a multilayer film having at least two or more layers formed from the types of materials that can be used for the dielectric layer 22.

Figure 4:
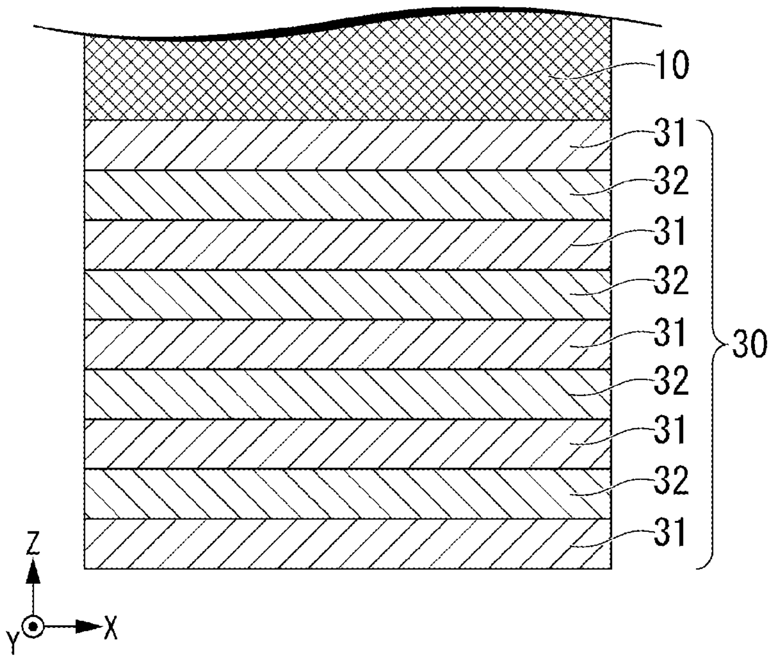
FIG. 4 is a cross-sectional schematic view in a case where the antireflection layer has a structure produced by alternately laminating a low-refractive index layer and a high-refractive index layer having different refractive indices.

In one example of the multilayer film, as illustrated in FIG. 4, by alternately laminating layers of a low-refractive index layer 31 and a high-refractive index layer 32 having different refractive indices, light that has undergone interface reflection can be attenuated by interference. There are no particular limitations on the thickness of the antireflection layer 30, which may be set within a range from 1 nm to 500 nm per single layer of dielectric material used in forming the dielectric layer 22. This thickness of the antireflection layer 30 can be measured, for example, using the microscope method described above.

The low-refractive index layer 31 is a layer containing $SiO_2$ (a Si oxide) or the like as the main component. The refractive index of the low-refractive index layer is preferably within a range from 1.20 to 1.60, and is more preferably from 1.30 to 1.50.

The refractive index of the high-refractive index layer 32 is preferably within a range from 2.00 to 2.60, and is more preferably from 2.10 to 2.45. Examples of this type of high-refractive index dielectric material include niobium pentoxide ($Nb_2O_5$, refractive index: 2.33), titanium oxide ($TiO_2$, refractive index 2.33 to 2.55), tungsten oxide ($WO_3$, refractive index: 2.2), cerium oxide ($CeO_2$, refractive index: 2.2), tantalum pentoxide ($Ta_2O_5$, refractive index: 2.16), zinc oxide (ZnO, refractive index: 2.1) and indium-tin oxide (ITO, refractive index: 2.06).

The antireflection layer 30 can be formed as a high-density film using the same deposition methods described above for the dielectric layer 22. The use of an ion beam assisted deposition (IAD) method or an ion beam sputtering (IBS) method that enables formation of a film of particularly high density is preferred.

Moreover, it is preferable that the design of the antireflection layer 30, including the materials and the thickness and the like, is conducted with due consideration of the subsequent formation of the protective films 40A and 40B, to ensure no deterioration in the optical characteristics.

[Protective Films]

The various surfaces 20*a* of the plurality of projections 20, and the surface 30A of the antireflection layer 30 are covered with the protective films 40A and 40B respectively, each of which is formed from the second dielectric material. By covering the structure with the protective film 40A and the protective film 40B, the durability of the polarization plate 100 can be improved.

The surfaces 20*a* of the projections 20 include a top surface 20*aa* of each projection 20 (which is also the top surface of the absorption layer 23), and side surfaces 20*ab* of each projection 20 including side surfaces 21*b* of the reflection layer 21, side surfaces 22*b* of the dielectric layer 22 and side surfaces 23*b* of the absorption layer 23, and the protective film 40A is composed of at least a protective film 40Aa that covers the top surfaces 20*aa* of the projections 20, and a protective film 40Ab that covers the side surfaces 20*ab* of the projections 20.

In the polarization plate 100 illustrated in FIG. 2, of the surface 10*a* of the transparent substrate 10, a surface 10*aa* on which neither the projections 20 nor the protective film 40A is formed is covered with a protective film 40AA.

For formation of the protective film 40A and the protective film 40B, use of an atomic layer deposition (ALD) method, which forms a dense uniform film and offers excellent control of the film thickness, is preferred. Further, in a similar manner to the dielectric layer 22 described above, the protective films may also be formed from two or more layers of different constituent materials.

In those cases where the gaps between the projections 20 are to be completely covered (the case illustrated in FIG. 2), a SOG (spin on glass) method may be used instead of one of the methods described above for forming the dielectric layer 22. SOG enables surface flattening without the inclusion of an air layer.

Moreover, it is preferable that the design of the protective films 40A and 40B, including the materials and the thicknesses and the like, is conducted with due consideration of the formation of the protective film 40B on the surface 30*a* of the antireflection layer 30, to ensure no deterioration in the optical characteristics.

The same dielectric material as the first dielectric material that constitutes the dielectric layer 22 may also be used as the second dielectric material used for forming the protective films 40A and 40B. From the viewpoint of the heat resistance, $Al_2O_3$ is particularly desirable.

The thickness of at least one of the protective film 40A and the protective film 40B may be 2.5 nm or less. In such cases, an improvement in the optical transmittance characteristics can be achieved, while maintaining the durability of the polarization plate 100, and in particular, any large deterioration in the optical characteristics can be avoided. In such cases, from the viewpoint of maintaining durability, the thickness is preferably at least 1 nm, more preferably at least 1.5 nm, and even more preferably 2.0 nm or greater.

The thickness of at least one of the protective film 40A and the protective film 40B may be 2.5 nm or greater. In such cases, an improvement in the optical transmittance characteristics can be achieved, while maintaining the durability of the polarization plate, and in particular, favorable heat resistance can be maintained. In such cases, from the viewpoint of improving the optical transmittance characteristics, the thickness is preferably not more than 10 nm, more preferably not more than 7.5 nm, and even more preferably 5.0 nm or less.

[Water-Repellent Film]

Moreover, in the polarization plate of this embodiment, at least one of the surfaces 100*a* and 100*b* of the polarization plate 100 may be covered with an organic water-repellent film (not shown in the drawings). The organic water-repellent film may be formed, for example, from a fluorine-based silane compound such as perfluorodecyltriethoxysilane (FDTS), and can be formed, for example, using a CVD method or an ALD method described above. This enables an improvement in the reliability such as the moisture resistance of the polarization plate.

[Production Method for Polarization Plate]

A production method for a polarization plate according to an embodiment of the present invention is a production method for the polarization plate 100 having a wire grid structure, the method having a step of forming a reflection layer, a dielectric layer and an absorption layer in order on the first surface 10*a* of the transparent substrate 10, thus producing a laminate composed of the reflection layer, the dielectric layer and the absorption layer, a step of selectively etching the laminate to form the plurality of projections 20 (each having the reflection layer 21, the dielectric layer 22 and the absorption layer 23) which extend in a first direction and are arrayed periodically and separated from each other at a pitch that is shorter than the wavelength of the used light region, a step of forming the antireflection layer 30 on the second surface 10*b* of the transparent substrate 10 on the opposite side from the first surface 10*a*, and a step of forming the protective films 40A and 40B composed of a dielectric material on the surfaces of the projections 20 and the surface of the antireflection layer 30.

In the formation of the plurality of projections 20, for example, a photolithography method or nanoimprinting method or the like is used to form a one-dimensional lattice-shaped mask pattern with a resist on the laminated film formed on one surface of the transparent substrate 10. By selectively etching the portions on which the mask pattern has not been formed, the plurality of arrayed projections 20 are formed on the transparent substrate 10 at a pitch that is shorter than the wavelength of the used light region. Examples of the etching method include dry etching methods using an etching gas suitable for the etching target.

By using the above method, the polarization plate 100 illustrated in FIG. 1 and FIG. 2 is produced. The production method for the polarization plate 100 according to this embodiment may also include a step of covering the surface of the polarization plate 100 with an organic water-repellent film.

[Optical Apparatus]

An optical apparatus of an embodiment of the present invention contains the polarization plate 100 according to the embodiment of the present invention described above. The polarization plate 100 according to an embodiment of the present invention can be used in all manner of applications. Examples of applicable optical apparatuss include liquid crystal displays and liquid crystal projectors, as well as heads-up displays and vehicle headlights. In particular, because the polarization plate 100 according to an embodiment of the present invention exhibits high transmittance, high brightness at high transmittance together with excellent heat resistance can be achieved, even under intense light environments of high luminous intensity using a number of semiconductor lasers (LD). Accordingly, the polarization plate 100 can be used particularly favorably in applications such as liquid crystal projectors and the like.

In those cases where an optical apparatus according to an embodiment of the present invention contains a plurality of polarization plates, at least one of the plurality of polarization plates may be the polarization plate 100 according to an embodiment of the present invention. For example, in those cases where the optical apparatus according to an embodiment of the present invention is a liquid crystal projector, at least one of the polarization plates disposed at the incident side and the emission side of the liquid crystal panel may be the polarization plate 100 according to an embodiment of the present invention.

EXAMPLES

Examples of the present invention are described below, but the present invention is not limited to these examples, and any modifications or improvements that exhibit the effects of the present invention are included within the present invention.

[Simulations]

Simulations of polarization plates according to the present invention were conducted using the polarization plate illustrated in FIG. 2 as a model. More specifically, the optical characteristics of these polarization plates was investigated by electromagnetic field simulation using RCWA (Rigorous Coupled Wave Analysis).

Figure 5:
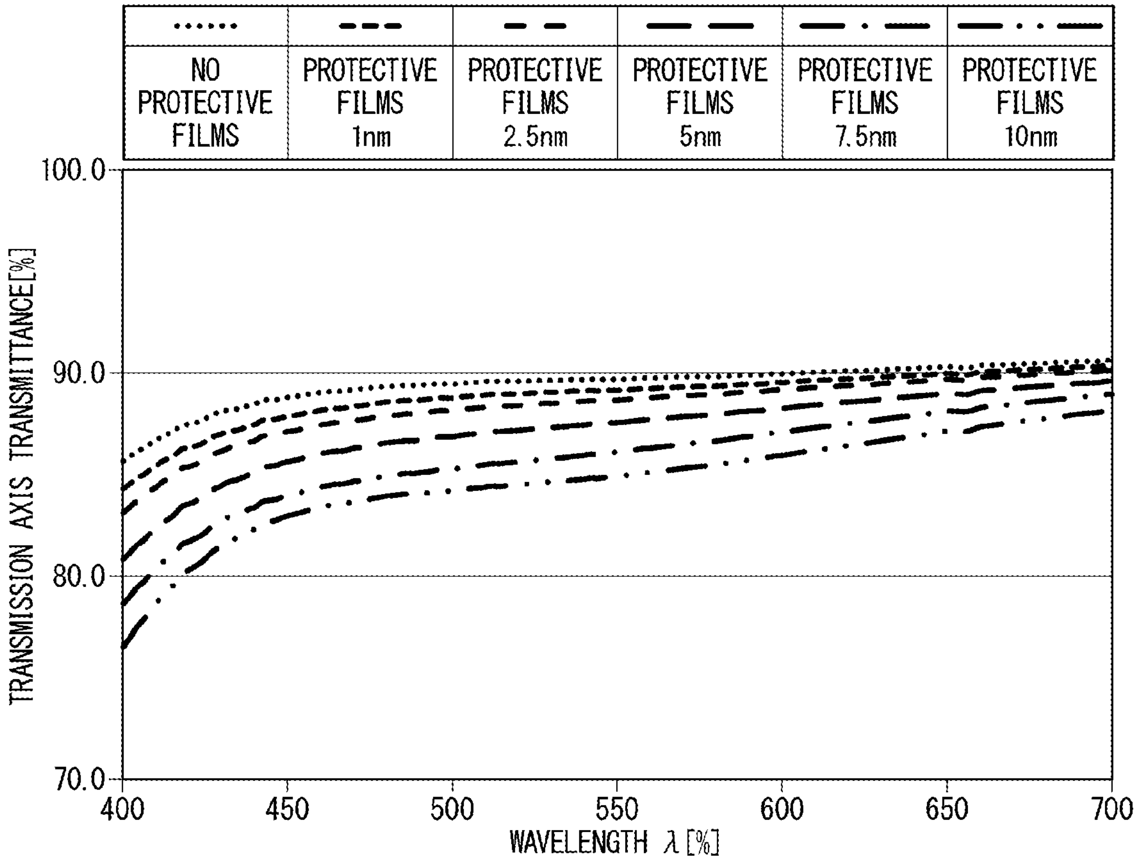
FIG. 5 is a graph illustrating the transmission axis transmittance, calculated by simulation, within the optical characteristics of polarization plates according to an embodiment of the present invention.

FIG. 5 is a graph illustrating the spectral waveform of the transmission axis transmittance in the visible light region (red region: wavelength $\lambda$=600 nm to 680 nm, green region: wavelength $\lambda$=520 nm to 590 nm, blue region: wavelength $\lambda$=430 nm to 510 nm), obtained by conducting a simulation using the polarization plate illustrated in FIG. 2 as a model. The horizontal axis indicates the wavelength $\lambda$ (nm), and the vertical axis indicates the transmission axis transmittance (%). Here, the transmission axis transmittance means the transmittance of polarized light (TM waves) in the transmission axis direction (X axis direction) of the light incident on the polarization plate.

The polarization plate model employed the following parameters and materials.

Transparent substrate: material (alkali-free glass), thickness (0.7 mm)

Reflection layer: material (Al), thickness (250 nm), width (35 nm)

Dielectric layer: material ($SiO_2$), thickness (5 nm), width (35 nm)

Absorption layer: material (FeSi), thickness (25 nm), width (35 nm)

Antireflection layer: material (alternating laminate of $TiO_2$ layers and $SiO_2$ layers), thickness (641.15 nm), width (35 nm), the specific layer configuration is shown in Table 1. The first layer through ninth layer were disposed in order from closest to the transparent substrate to farthest.

Grid: height h (280+protective film thickness) nm, width w (35+protective film thickness×2) nm, pitch p (141 nm)

TABLE 1

| | Constituent material | Thickness (nm) |
|---|---|---|
| First layer | $SiO_2$ | 170.99 |
| Second layer | $TiO_2$ | 12.76 |
| Third layer | $SiO_2$ | 33.72 |
| Fourth layer | $TiO_2$ | 121.52 |
| Fifth layer | $SiO_2$ | 36.77 |
| Sixth layer | $TiO_2$ | 25.13 |
| Seventh layer | $SiO_2$ | 39.09 |
| Eighth layer | $TiO_2$ | 114.39 |
| Ninth layer | $SiO_2$ | 86.78 |
| Total | | 641.15 |

Further, in the polarization plate model, the protective films (reference signs 40A and 40B in FIG. 2) employed $Al_2O_3$ as the constituent material, and the thickness of the films was set to 1 nm, 2.5 nm, 5 nm, 7.5 nm, or 10 nm. Furthermore, as a comparative example, a simulation was also conducted with no protective films, and is also shown in FIG. 5.

The protective films are able to improve the durability of the polarization plate, but from FIG. 5, it is evident that as the thickness of the protective films is increased, the transmission axis transmittance across the entire visual light region decreases, with a particularly large fall at the short wavelength side.

Examples 1-1 to 1-3, Comparative Example 1

Figure 6:
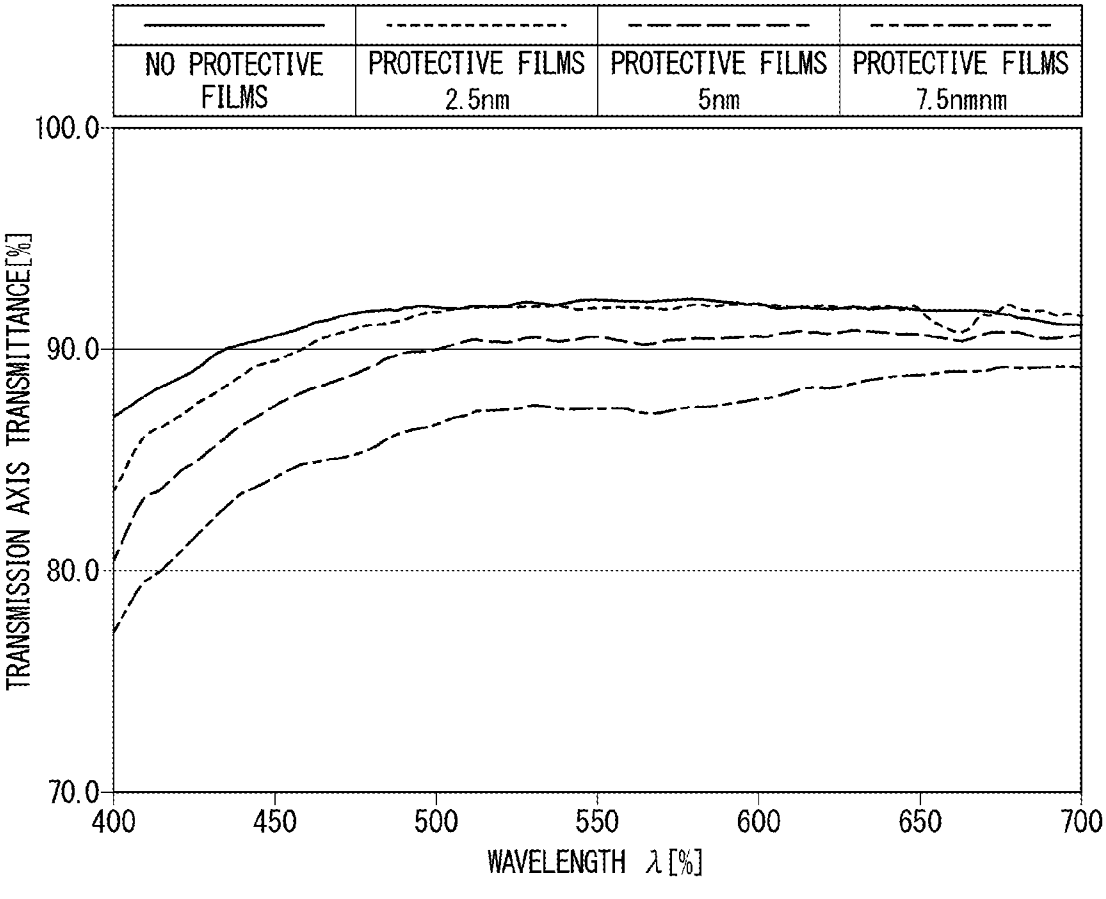
FIG. 6 is a graph illustrating the results of measuring the transmission axis transmittance in Examples 1-1 to 1-3.

With the exception of using a protective film thickness of 2.5 nm (Example 1-1), a protective film thickness of 5 nm (Example 1-2), or a protective film thickness of 7.5 nm (Example 1-3), actual polarization plates were produced using the same parameters as those employed in the above simulations, and the transmission axis transmittance was measured. The results are shown in FIG. 6. Further, the transmission axis transmittance of a polarization plate with no protective films (Comparative Example 1) was also measured, and that result is also shown in FIG. 6.

It is evident that the simulation results shown in FIG. 5 accurately reflect the optical characteristics of the actual polarization plates.

Based on the results of FIG. 5 and FIG. 6, it was evident that in those cases where a transmission axis transmittance of 80% or greater is required at all wavelengths across a wavelength range from 400 nm to 700 nm, the thickness of the protective films is preferably set to 5 nm or less.

Further, in those cases where a transmission axis transmittance of 80% or greater is required at all wavelengths across a wavelength range from 430 nm to 700 nm, the thickness of the protective films is preferably set to 10 nm or less.

Figure 7:
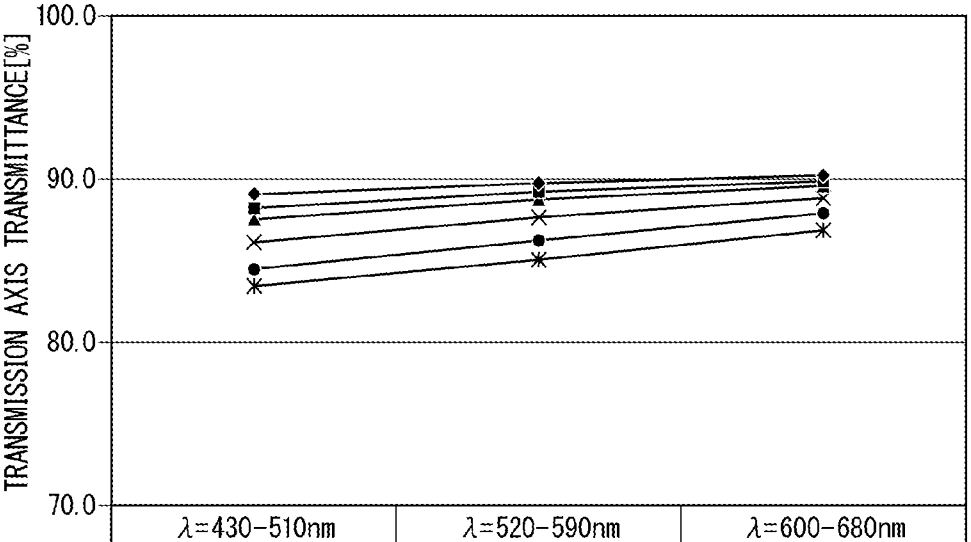
FIG. 7 is a graph illustrating the average transmission axis transmittance in various wavelength regions for the transmission axis transmittance, calculated by simulation, for polarization plates according to an embodiment of the present invention.

FIG. 7 is a graph illustrating the average value for the transmission axis transmittance in various wavelength regions, obtained by conducting simulations.

Figure 8:
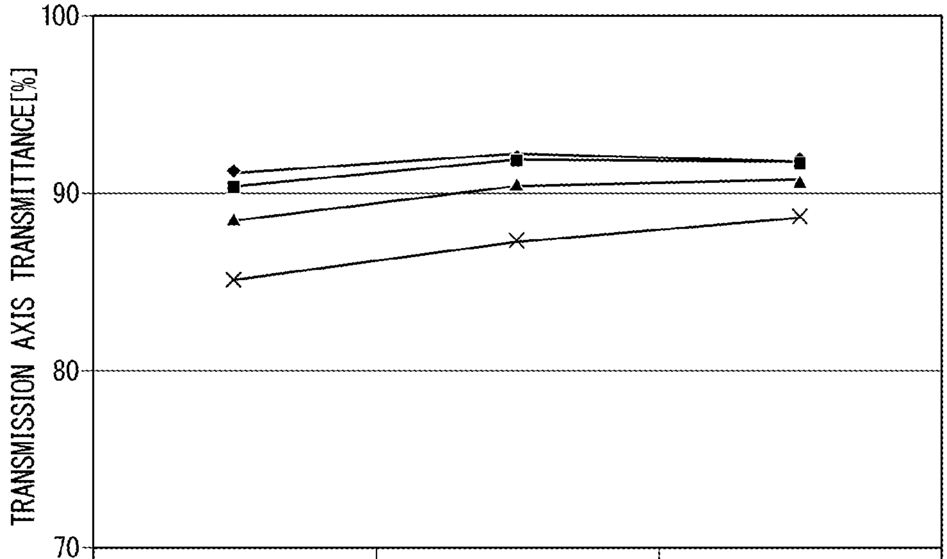
FIG. 8 is a graph illustrating the results of measuring the average transmission axis transmittance for various wavelength regions in Examples 1-1 to 1-3.

FIG. 8 is a graph illustrating the average value for the transmission axis transmittance for various wavelength regions, measured using the polarization plates of Examples 1-1 to 1-3 and Comparative Example 1. It is evident that the simulation results shown in FIG. 7 accurately reflect the optical characteristics of the actual polarization plates.

Based on FIG. 7 and FIG. 8, in those cases where an average transmission axis transmittance of 86% or greater is required in all of the red light region, the green light region and the blue light region, the thickness of the protective films is preferably set to 5 nm or less.

Further, in those cases where an average transmission axis transmittance of 90% or greater is required in all of the red light region, the green light region and the blue light region, the thickness of the protective films is preferably set to 2.5 nm or less.

[Heat Resistance Evaluation]

Heat resistance evaluations were conducted using actually produced polarization plates as the polarization plate according to the present invention. The heat resistance evaluation were conducted in a clean oven at 300° C., by evaluating the change in contrast, which represents one of the optical characteristics of the polarization plate, from the initial value, namely the value prior to insertion into the clean oven. The contrast can be calculated as transmission axis transmittance/absorption axis transmittance, wherein the absorption axis transmittance means the transmittance of polarized light (TE waves) in the absorption axis direction (Y axis direction) of the light incident on the polarization plate. The change in contrast is suitable for comprehending the effects on the heat resistance of the polarization plate.

Figure 9:
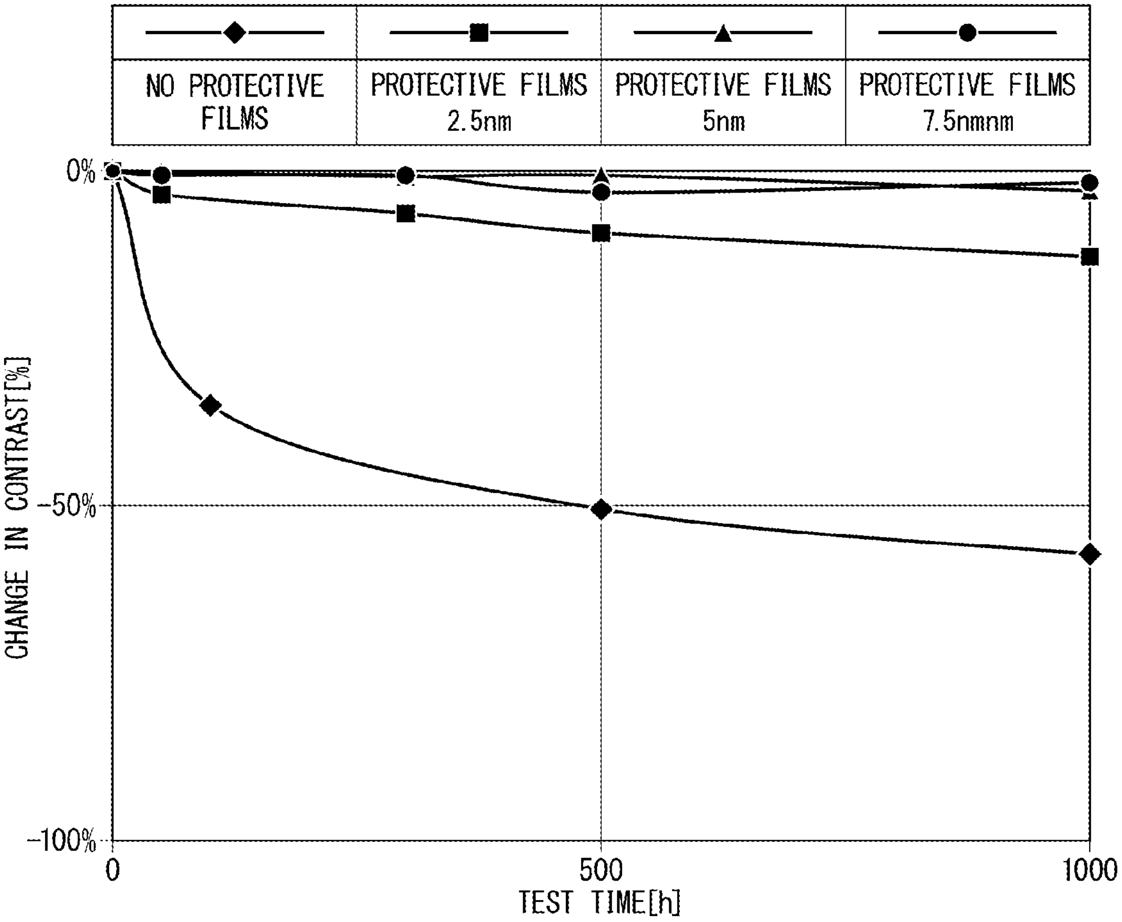
FIG. 9 is a graph comparing the contrast within the optical characteristics of polarization plates according to an embodiment of the present invention that were actually produced and were then subjected to a heat resistance evaluation.

FIG. 9 is a graph comparing the contrast within the optical characteristics of the actually produced polarization plates based on the results of the heat resistance evaluations. The horizontal axis indicates the test time (the time inside the clean oven) and the vertical axis indicates the change in contrast, and the case in which light from the green light region of the visible light region (wavelength=520 nm to 590 nm) was used as the incident light is shown as an example. In FIG. 9, the result for the case in which no protective films were provided is also shown.

As shown in FIG. 9, as the thickness of the protective films is increased, the change in the contrast decreases, and the durability of the polarization plate improves. The case in which light of the green light region was used as the incident light was presented as an example, but even if light of the red light region (wavelength=600 nm to 680 nm) or light of the blue light region (wavelength=430 nm to 510 nm) is used, similar effects are achieved, with only a small variation in the values for the change in contrast.

Based on the results of FIG. 9, it is evident that by ensuring the thickness of the protective films is at least 2.5 nm, a high degree of heat resistance can be maintained.

Based on the above results, it was evident that the polarization plate of the present invention provided with protective films on the surfaces of the projections and the surface of the antireflection layer was able to achieve improved light transmittance characteristics while maintaining favorable durability, and that a thickness of 2.5 nm or less was desirable for preventing any marked deterioration in the optical characteristics, whereas a thickness of 2.5 nm or greater was desirable for maintaining superior heat resistance.

Further, in the formation of the protective films, both the protective films and the antireflection layer are preferably designed with due consideration of the effects on not only the plurality of projections but also on the antireflection layer.

DESCRIPTION OF THE REFERENCE SIGNS

10: Transparent substrate

10*a*: First surface

10*b*: Second surface
20: Projection
21: Reflection layer
22: Dielectric layer
23: Absorption layer
30: Antireflection layer
40A, 40B: Protective film
100: Polarization plate
100*a*: Surface of polarization plate

The invention claimed is:

1. A polarization plate having a wire grid structure, the polarization plate comprising:

a transparent substrate, a plurality of projections which are formed on a first surface of the transparent substrate, extend in a first direction, and are arrayed periodically and separated from each other at a pitch that is shorter than a wavelength of a used light region, and an antireflection layer which is formed on a second surface of the transparent substrate on an opposite side from the first surface, wherein the plurality of projections each have, in order from a side of the transparent substrate, a reflection layer, a dielectric layer formed from a first dielectric material, and an absorption layer, surfaces of the projections and a surface of the antireflection layer are covered with a protective film formed from a second dielectric material, and a thickness of the protective film is at least 1 nanometer (nm) and 2.5 nm or less, and the dielectric layer formed from the first dielectric material is formed from SiO2, and the protective film formed from the second dielectric material is formed from $Al_2O_3$.

2. The polarization plate according to claim 1, wherein, the protective film formed from the second dielectric material is an ALD film.

3. The polarization plate according to claim 1, wherein the transparent substrate is transparent to a wavelength of a used light region, and is composed of a material selected from a group consisting of glass, rock crystal, quartz and sapphire.

4. The polarization plate according to claim 1, wherein the reflection layer is composed of aluminum or an aluminum alloy.

5. The polarization plate according to claim 1, wherein the absorption layer is composed of a material that has an absorption action relative to a wavelength of a used light region, and that is selected from a group consisting of metals, alloy materials and semiconductor materials.

6. The polarization plate according to claim 1, wherein a surface of the polarization plate is covered with an organic water-repellent film.

7. The polarization plate according to claim 1, wherein the antireflection layer is an alternating laminate of a high-refractive index film and a low-refractive index film.

8. The polarization plate according to claim 7, wherein the antireflection layer is an ion beam assisted vapor deposition film or an ion beam sputtering film.

9. The polarization plate according to claim 7, wherein the high-refractive index film is formed from $TiO_2$, and the low-refractive index film is formed from $SiO_2$.

10. An optical apparatus comprising the polarization plate according to claim 1.

11. A production method for a polarization plate having a wire grid structure, the method comprising:

a step of forming a reflection layer, a dielectric layer formed from a first dielectric material, and an absorption layer in order on a first surface of a transparent substrate, thus producing a laminate composed of the reflection layer, the dielectric layer and the absorption layer, a step of selectively etching the laminate to form a plurality of projections which extend in a first direction and are arrayed periodically and separated from each other at a pitch that is shorter than a wavelength of a used light region, a step of forming an antireflection layer on a second surface of the transparent substrate on an opposite side from the first surface, and a step of forming a protective film formed from a second dielectric material on surfaces of the projections and a surface of the antireflection layer, wherein a thickness of the protective film is at least 1 nanometer (nm) and 2.5 nm or less, and the dielectric layer formed from the first dielectric material is formed from SiO2, and the protective film formed from the second dielectric material is formed from $Al_2O_3$.

12. The production method for a polarization plate according to claim 11, the method further comprising: a step of forming an organic water-repellent film on a surface of the polarization plate.

* * * * *